June 26, 1951  J. T. BROWN ET AL  2,558,123
STALK CUTTING ATTACHMENT FOR FARM TRACTORS
Filed Sept. 16, 1949  2 Sheets-Sheet 2
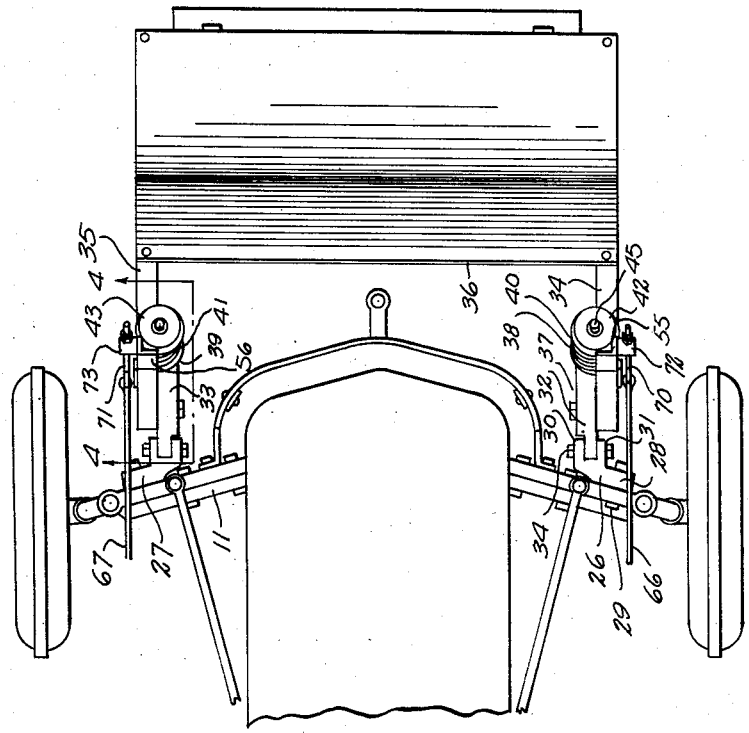
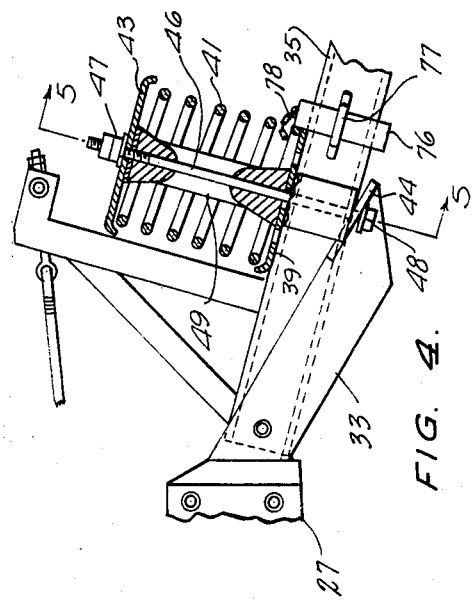
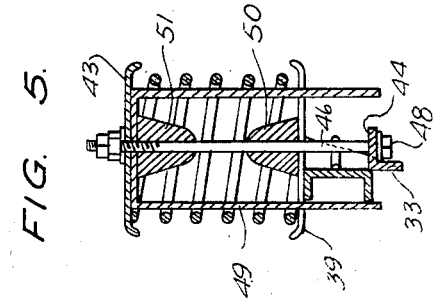
INVENTORS
CLYDE N. OAKES,
JOSEPH T. BROWN,
BY
ATTORNEYS Patented June 26, 1951

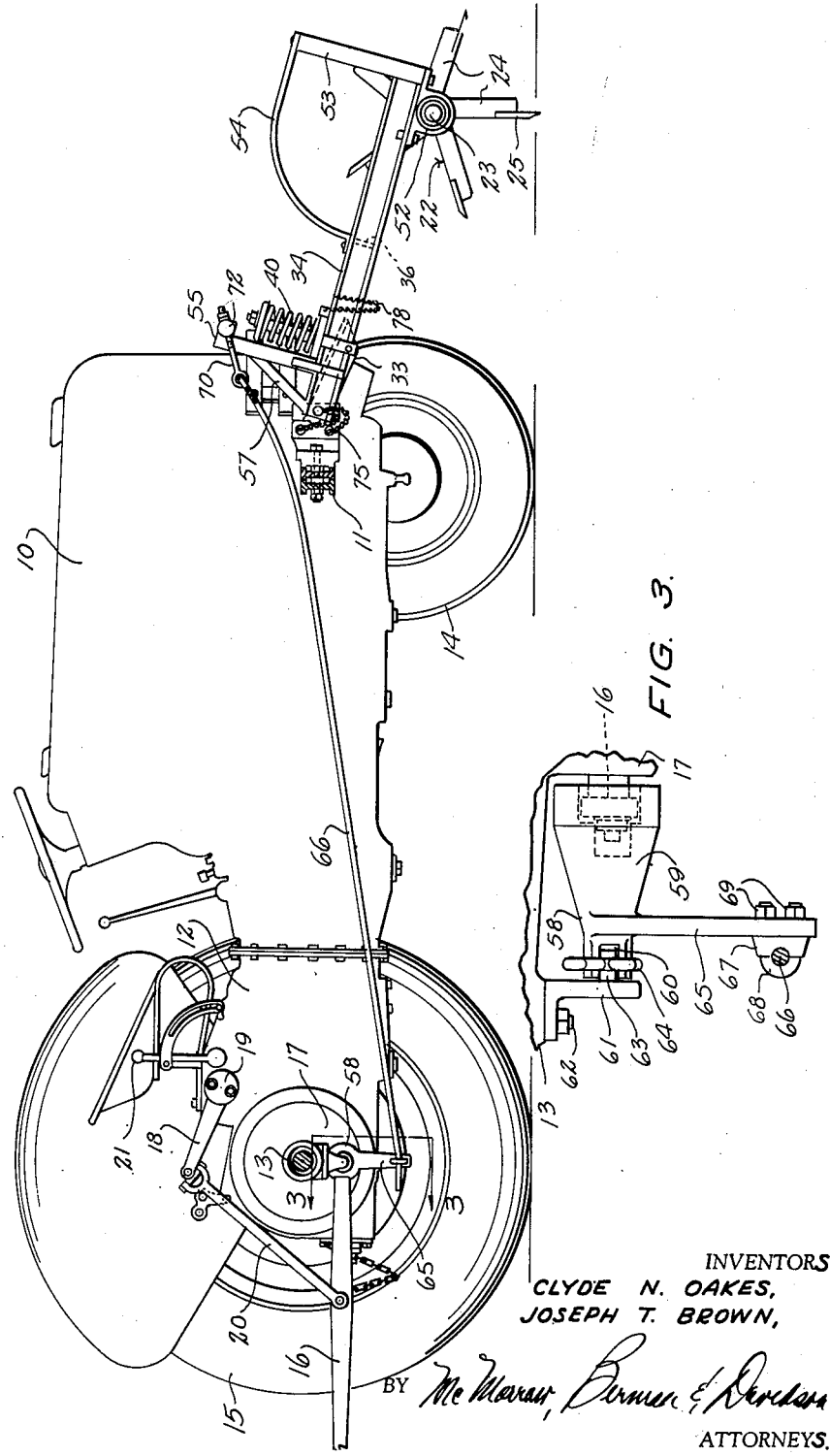

2,558,123

UNITED STATES PATENT OFFICE 2,558,123

STALK CUTTING ATTACHMENT FOR FARM TRACTORS

Joseph T. Brown and Clyde N. Oakes, Elkin, N. C.

Application September 16, 1949, Serial No. 116,196

1 Claim. (Cl. 55—61)

This invention relates to stalk cutting attachments for farm tractors, and more particularly to such an attachment especially designed for a tractor equipped with a power-operated implement lift.

It is among the objects of the invention to provide an improved stalk cutting attachment for a farm tractor equipped with a power-operated implement lift which attachment positions the stalk cutting reel directly in front of the tractor, provides resilient means for holding the reel firmly in contact with the ground and means operated by the implement lift of the tractor under manual control for lifting the reel above the ground, which attachment is strong, simple and durable in construction, economical to manufacture, easy to install on a tractor, and does not interfere, in any way, with the normal operation of the tractor or the operation of an implement, such as a plow or harrow towed by the tractor.

Other objects and advantages will become apparent from a consideration of the following description and the appended claim in conjunction with the accompanying drawings, wherein:

Figure 1 is a side elevation of a well-known type of farm tractor with a stalk cutting attachment illustrative of the invention operatively assembled therewith, the nearer tractor wheels being omitted and the axles shown in cross-section in order to simplify the illustration;

Figure 2 is a top plan view of a fragmentary front portion of the tractor and the portion of the stalk cutting attachment disposed forwardly of the tractor;

Figure 3 is an elevation on a plane indicated by the line 3—3 of Figure 1 and showing a structural detail of the stalk cutting attachment;

Figure 4 is a cross-sectional view on the line 4—4 of Figure 2 showing a further constructional detail of the attachment; and Figure 5 is a cross-section on the line 5—5 of Figure 4.

With continued reference to the drawings, the farm tractor illustrated therein is a well-known form of tractor equipped with a power-operated implement lift and may be of the type known as a Ford-Ferguson, Ford or Ferguson tractor, although the stalk cutting attachment may be applied to other tractors having power-operated implement lifts without in any way exceeding the scope of the invention.

The tractor has an engine 10 supported at its front end on a front axle 11, a transmission and differential unit 12 joined to the rear end of the engine and supported on the rear axle 13, front wheels 14 journaled on the front axle at respectively-opposite ends of the axle, and rear wheels 15 mounted on the rear axle at respectively-opposite ends of the latter. A pair of spaced-apart tension links 16 is pivotally connected at their front ends to brackets 17 secured to and depending from the rear axle 13, a pair of lift arms 18 is secured on the respectively-opposite ends of a lift shaft 19 which extends transversely through the unit 12 above the tractor differential, and a pair of struts 20 connects the free ends of the lift arms 18 respectively to the tension links 16 at corresponding sides of the tractor. The lift shaft is rotated by suitable means driven by the tractor engine under manual control through the hand lever 21, and the shaft 19, arms 18, struts 20 and tension links 16 constitute a power-operated implement lift for the tractor.

This reel comprises a shaft 23, two sets of spokes 24 secured to the shaft near respectively opposite ends of the shaft with the spokes in each set projecting radially from the shaft and spaced apart at substantially equal angular intervals, and blades 25 carried by the spokes at the outer ends of the latter, the blades being substantially parallel to each other and to the shaft 23.

This reel is rolled along the ground by forward movement of the tractor, and under pressure against the ground, so that it breaks down and severs plant stalks, such as the stalks of corn, cotton or large weeds standing in front of the tractor.

The tractor itself is of well-known construction and constitutes no part of the present invention, except in the combination thereof with the novel stalk cutting attachment, and the cutting reel of the attachment may also be of a previously-disclosed construction. The present invention is concerned primarily with the means for operatively mounting the reel 22 on a tractor of the type illustrated, equipped with power-operated implement lift apparatus.

The reel-mounting means of the present invention comprises two brackets 26 and 27 mounted on the front side of the front axle 11 of the tractor near respectively-opposite ends of such axle. These brackets are identical in construction, except that one is right-hand and the other is left-hand, and each includes a base portion 28 which lies against the front face of the axle and is apertured to receive bolts 29 which extend through the base portion 28 and through the axle to rigidly secure the brackets to the axle, and two spaced-apart, apertured lugs 30 and 31 which extend forwardly from the base portion 28 when the bracket is in operative position on the tractor, to receive therebetween the rear end of a corresponding beam 32. Each of the beams 32 and 33 is a metal bar of elongated, rectangular, cross-sectional shape having at one end a reduced portion dimensioned to fit between the lugs 30 and 31 of the corresponding bracket 26 or 27. The two lugs of each bracket are provided with two spaced-apart apertures, and the reduced end portion of each beam is provided with two spaced-apart apertures which register with the apertures in the bracket lugs when the beams are operatively associated with the bracket, and suitable pins 34 are inserted through the apertures in the bracket lugs and the beams to rigidly secure the beams to the bracket.

As is particularly illustrated in Figures 1 and 4, the beams incline forwardly and downwardly from the bracket, and each beam has an upwardly and forwardly inclined front end.

Two frame side members 34 and 35 are secured in spaced-apart, substantially parallel relationship by a frame cross-member 36 connected at its opposite ends to the side members 34 and 35 intermediate the length of the side members, and each of the side members is pivotally connected near its rearward end to a corresponding beam, the side member 34 being connected to beam 32, and the side member 35 being connected to the beam 33. The side members 34 and 35 are preferably formed of lengths of channel iron, and the pivotal connection between each side member and the corresponding beam is made by a bolt 37 extending through registering apertures in the beam near the corresponding bracket and in the frame side member near the rear end of the latter.

The two frame side members carry on their upper surfaces and near their pivotal connections with the corresponding beams, spring seats 38 and 39, respectively, which receive the bottom ends of coiled compression springs 40 and 41. Caps 42 and 43 are disposed, respectively, on the upper ends of the springs 40 and 41, and each of these caps is provided with a central aperture.

Each of the beams 32 and 33 is provided with an off-set, apertured lug 44, and bolts 45 and 46 extend through these lugs and upwardly through the spring seats 38 and 49, through the springs and through the spring caps 42 and 43, respectively, and are provided at their upper ends with screw threads which receive nuts 47 which are threaded down against the caps 42 and 43. At its lower end, each bolt is provided with a head 48 which bears against the under side of the associated, beam-carried lug 44. When the nuts 47 are threaded down to compress the corresponding springs 40 and 41, the frame side members 34 and 35 are resiliently forced downwardly.

If desired, a U-shaped spring guide 49 may have its bight secured to the under side of the spring cap, and its legs slidably extended through openings in the spring seat, and extensions 50 and 51 may be provided on the inner side of the seat and the cap or guide to extend toward each other and surround the bolt to provide a guide for the bolt, as is particularly illustrated in Figure 5.

Bearing blocks, as indicated at 52 in Figure 1, are secured to the frame side members 34 and 35, respectively, at the under sides of these members and near the free or forward ends thereof, and the reel shaft 23 is journaled at its respectively-opposite ends in these bearing blocks. With the above construction, the springs 40 and 41 act to resiliently press the reel 22 against the ground ahead of the tractor.

A supporting structure 53 is secured at its opposite ends to the frame side members 34 and 35 at the forward or free ends of the latter, and extends upwardly substantially perpendicular to these frame side members. A curved sheet metal shield or cover 54 is secured at its front end to the top of the structure 53, and at its rear end to the upper surface of the frame cross-member 36 and overlies the rearward, upper portion of the reel 22 to prevent the reel from projecting dirt or debris against the front of the tractor.

Posts 55 and 56 are secured at their lower ends to the frame side members 34 and 35, respectively, at locations spaced forwardly from the pivotal connections between these frame side members and the corresponding beams 32 and 33, and project upwardly from the frame side members substantially perpendicular thereto. These posts are disposed immediately to the rear of the springs 40 and 41, and each post is reinforced by a diagonal brace 57 extending from the rear end of the corresponding frame side member to the post at a location intermediate the length of the latter.

Two auxiliary arms, as indicated at 58 in Figure 1, are operatively connected to the tension links 16 of the tractor, respectively, and project downwardly from the brackets 17 which support the forward end of the tension links below the rear axle of the tractor.

Each of these auxiliary arms comprises a cupped portion 59 which overlies the forward end of the corresponding tension link 16, and receives the nut by means of which the tension link is secured on the corresponding bracket 17, the cup being provided with a transverse recess in which the tension link is received, so that the cup will be rotated when the tension link is moved up and down by the corresponding lift arms 18 of the implement lift mechanism. At its outer end, each of the bracket cups 59 is provided with a slot 60, and a bracket 61 is secured to the under side of the tractor rear axle at the outer end of the cup by a stud bolt 62 and carries a pintle 63 received in the slot 60 of the auxiliary arm cup portion 59. The pintle is maintained in the slot 60 by a removable key 64, so that, upon removal of the key the auxiliary arm may be removed from the tractor without removing the auxiliary arm-supporting bracket 61. Each auxiliary arm further comprises an arm or lever 65 secured at one end to the cup portion 59 and projecting downwardly therefrom when the auxiliary arms are mounted in operative association with the tension link 16 of the tractor.

Two cables 66 and 67 extend from the auxiliary arms 58 at respectively-opposite sides of the tractor to the corresponding posts 55 and 56.

Each of the cables is secured near its rearward end to the lower end of the corresponding auxiliary arm 65 by a clamp assembly comprising a recessed base 79 disposed against the outer side of the corresponding auxiliary arm, and a U-shaped clip 68 extending through the base 67 and through the arm and carrying at the side of the arm opposite the base, nuts 69 for compressing the cable between the bight portion of the clip and the base 67. Ring bolts 70 and 71 are adjustably secured to the posts 55 and 56, respectively, at the upper ends of the posts by being threaded through studs 72 and 73 pivotally mounted on the posts, and the cables 66 and 67 are connected at their forward ends to the eye bolts 70 and 71, respectively.

With this construction, when the hand-control lever 21 is moved to cause the power-operated lift mechanism to raise the tension links 16, the auxiliary arms 58 will be swung rearwardly, tensioning the cables 66 and 67 which will then pull rearwardly on the upper ends of the posts 55 and 56, and raise the frame side members 34 and 35 against the force of the springs 40 and 41 to raise the cutting reel 22 above the ground.

When the reel is to be carried for considerable distances in raised position, suitable wedges may be placed between the frame side members 34 and 35 and the corresponding beams 32 and 33, so that the lift mechanism of the tractor can be relieved of the burden of supporting the reel above the ground under these conditions.

The pins for connecting the beams 32 and 33 to the brackets 26 and 27 are preferably attached to the beams by short lengths of flexible strands 75, so that the pins will not be accidentally lost or misplaced, and the wedges or blocks, as indicated at 76 in Figure 4, for supporting the cutting reel above the ground, may be carried, when not in use, in suitable loops 77 provided on the frame side members and attached to the frame side members by flexible strands 78 to prevent their accidental loss.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

Means for mounting a stalk cutting reel on a tractor having a front axle, a rear axle and a pair of power-operated lifting links carried by the tractor adjacent the rear axle comprising a pair of brackets attachable to the tractor front axle near respectively-opposite ends of the latter, a beam rigidly attached at one end to each bracket and projecting forwardly therefrom, a frame side member pivotally connected at one end to each beam near the associated bracket and projecting forwardly from the respective beam, a bearing box on each frame side member near the forward end of the latter, a reel-carrying axle journaled at its opposite ends in said bearing boxes, a spring carried by each frame side member, means connecting said springs to said beams to exert a downward pressure on said frame side members, an upstanding post on each of said frame side members, an auxiliary arm attachable to each of the tractor links, and a cable connecting each auxiliary lift arm at its outer end to the upper end of the post at the same side of the tractor for raising said frame side members against the force of said springs.

JOSEPH T. BROWN.
CLYDE N. OAKES.

REFERENCES CITED

The following references are of record in the file of this patent:

UNITED STATES PATENTS

| Number | Name | Date |
| --- | --- | --- |
| 1,817,999 | Michalka | Aug. 11, 1931 |
| 2,314,214 | Hilblom | Mar. 16, 1943 |
| 2,388,411 | Hicks | Nov. 6, 1945 |